(12) United States Patent
Nishimura

(10) Patent No.: US 11,181,198 B2
(45) Date of Patent: Nov. 23, 2021

(54) NON-SEALED BUTTERFLY VALVE AND METHOD FOR PRODUCING THE SAME

(71) Applicant: CKD CORPORATION, Komaki (JP)

(72) Inventor: Yasunori Nishimura, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/144,350

(22) Filed: Jan. 8, 2021

(65) Prior Publication Data

US 2021/0239219 A1 Aug. 5, 2021

(30) Foreign Application Priority Data

Feb. 3, 2020 (JP) .............................. JP2020-016103

(51) Int. Cl.
*F16K 1/22* (2006.01)
*F16K 51/02* (2006.01)

(52) U.S. Cl.
CPC .............. *F16K 1/222* (2013.01); *F16K 1/221* (2013.01); *F16K 51/02* (2013.01); *F16K 2200/40* (2021.08)

(58) Field of Classification Search
CPC ......... F16K 1/22–2285; F16K 27/0218; F16K 51/02; F16K 2200/40
USPC ............................................ 138/46; 118/715
See application file for complete search history.

(56) References Cited

U.S. PATENT DOCUMENTS

| | | | | |
|---|---|---|---|---|
| 10,557,736 | B2* | 2/2020 | Chamberlain | G01F 9/001 |
| 2012/0080630 | A1* | 4/2012 | Tsutomu | F16K 51/02 251/314 |
| 2015/0059648 | A1* | 3/2015 | Rudolph | F16K 1/2261 118/722 |
| 2016/0001650 | A1* | 1/2016 | Wright | B60K 11/02 165/51 |
| 2018/0224001 | A1* | 8/2018 | Malik | F02D 9/08 |

FOREIGN PATENT DOCUMENTS

JP 2019-019851 A 2/2019

* cited by examiner

*Primary Examiner* — Kevin F Murphy
(74) *Attorney, Agent, or Firm* — Oliff PLC

(57) ABSTRACT

In a non-sealed butterfly valve, a butterfly valve element includes a downstream end face that faces a downstream side of a flow passage during valve closing and a maximum outer diameter portion that makes a gap with a minimum distance. The butterfly valve element includes a first chamfered portion that reduces the diameter of the butterfly valve element from the maximum outer diameter portion to the downstream end face over the entire circumference. The first chamfered portion has a taper angle of 5° or less relative to the thickness direction of the butterfly valve element. The first chamfered portion and the downstream end face intersect each other at a ridge line that falls within an imaginary circle that is centered on the central axis of the butterfly valve element and passes the maximum outer diameter portion.

4 Claims, 11 Drawing Sheets

NON-SEALED BUTTERFLY VALVE AND METHOD FOR PRODUCING THE SAME

CROSS-REFERENCE TO RELATED APPLICATIONS

This application is based upon and claims the benefit of priority from the Japanese Patent Application No. 2020-016103 filed on Feb. 3, 2020, the entire contents of which are incorporated herein by reference.

BACKGROUND

Technical Field

The present invention relates to a non-sealed butterfly valve to be placed on a pipe connecting a vacuum chamber and a vacuum pump to control the vacuum pressure in the vacuum chamber, the non-sealed butterfly valve including a flow passage, a rod extending in a direction perpendicular to the flow passage, and a disk-shaped butterfly valve element coupled to the rod so that the butterfly valve element is rotated in association with rotation of the rod about a central axis of the rod to open and close the flow passage, in which a predetermined gap is provided between an inner peripheral surface of the flow passage and an outer peripheral surface of the butterfly valve element during valve closing, and a method for producing the non-sealed butterfly valve.

Related Art

In a semiconductor manufacturing process, conventionally, a butterfly valve having a large conductance of a flow passage and serving as a vacuum pressure control device is placed in many cases between a vacuum chamber and a vacuum pump to control the vacuum pressure in the vacuum chamber. For example, the butterfly valve used therein is configured, as disclosed in Japanese unexamined patent application publication No. 2019-19851, such that a rod is rotated by a motor to make the butterfly valve element contact with or separate from an annular valve seat.

The atomic layer deposition (ALD) method which has been widely used as a technique of forming a film on a wafer only needs control of the pressure in the vacuum chamber. Thus, the butterfly valve is not required to completely seal the flow passage during valve closing. Accordingly, there is sometimes used a non-sealed butterfly valve configured such that a predetermined gap is provided between an inner peripheral surface of the flow passage and an outer peripheral surface of the butterfly valve element even during valve closing.

Such a non-sealed butterfly valve may include a non-sealed butterfly valve 101 for example as shown in FIGS. 11 and 12. In this non-sealed butterfly valve 101, a butterfly valve element 109 has a circular disc shape. During valve closing, a maximum outer diameter portion 109a corresponding to the vertex of a circular arc portion 109b of the butterfly valve element 109 faces the inner peripheral surface of the flow passage 130 with a gap of several tens of μm therefrom. This gap serves as a restriction part 150 of the flow passage 130. In the restriction part 150, the inner peripheral surface of the flow passage 130 and the ridge line of the maximum outer diameter portion 109a dominantly function as a restrictor. The circular arc portion 109b other than the maximum outer diameter portion 109a does not effectively function as the restrictor as compared with the maximum outer diameter portion 109a.

SUMMARY

Technical Problems

However, the above-described related art has the following issues.

In the restriction part 150 of the non-sealed butterfly valve 101, the inner peripheral surface of the flow passage 130 and the ridge line of the maximum outer diameter portion 109a dominantly functions as a restrictor, which has no length in a direction parallel to the flow passage 130. Thus, the restriction part 150 is not expected to exhibit the effect of a restrictor with a length in a direction parallel to the flow passage 130 and hence provides only a small effect even during valve closing. Furthermore, even in a state where the rotation angle of the rod 110 is small just after starting to rotate from the valve closed position of the butterfly valve element 109, the restriction function provided by the gap between the maximum outer diameter portion 109a and the flow passage 13 may suddenly become non-functional. Such a small effect of the restriction part 150 may cause rapid release of gas from the vacuum chamber. If the gas is drastically released from the vacuum chamber, the pressure value in the vacuum chamber sharply lowers, which may cause stirring-up of particles adhered on the wall surface of the vacuum chamber or cause positional displacement of a wafer fixed inside the vacuum chamber. The stirring-up of particles and the positional displacement of a wafer are problematic in increasing the percent defective of semiconductors.

Furthermore, the gap between the maximum outer diameter portion 109a and the flow passage 130 is as extremely small as several tens of μm, as indicated above. If the accuracy of the mounting position of the butterfly valve element 109 is low, when the rod 110 is rotated to open/close the butterfly valve element 109, the maximum outer diameter portion 109a of the butterfly valve element 109 may interfere with the inner peripheral surface of the flow passage 130. To avoid this interference, the mounting position of the butterfly valve element 109 needs very high accuracy. This causes a problem with difficulty in controlling the accuracy of mounting position.

The present disclosure has been made to address the above problems and has a purpose to provide a non-sealed butterfly valve capable of preventing drastic release of gas from a vacuum chamber and a method for producing the non-sealed butterfly valve that makes it easy to enhance the accuracy of the mounting position of a butterfly valve element.

Means of Solving the Problems

To achieve the above-mentioned purpose, one aspect of the present disclosure provides a non-sealed butterfly valve to be placed on a pipe connecting a vacuum chamber and a vacuum pump to control vacuum pressure in the vacuum chamber, the non-sealed butterfly valve comprising: a flow passage; a rod placed extending in a direction perpendicular to the flow passage; and a butterfly valve element having a circular disk shape, coupled to the rod and configured to rotate in association with rotation of the rod about a central axis of the rod to open and close the flow passage, the butterfly valve element including an outer peripheral surface configured to make a predetermined gap with respect to an inner peripheral surface of the flow passage during valve closing, wherein the butterfly valve element includes a downstream end face that faces a downstream side of the flow passage during valve closing and the outer peripheral surface having a maximum outer diameter portion that makes the gap with a minimum distance, the outer peripheral surface of the butterfly valve element further includes a chamfered portion extending over an entire outer circumference so that the butterfly valve element has a diameter decreasing from the maximum outer diameter portion to the downstream end face, the chamfered portion has an angle equal to or less than 5° relative to a thickness direction of the butterfly valve element, and the chamfered portion and the downstream end face intersect each other at a ridge line falling within an imaginary circle centered on the central axis of the rod, the imaginary circle passing the maximum outer diameter portion.

The foregoing non-sealed butterfly valve can prevent the vacuum chamber from being subjected to drastic gas release.

The butterfly valve element includes: the maximum outer diameter portion that makes the predetermined gap with a minimum distance between the inner peripheral surface of the flow passage and the outer peripheral surface of the butterfly valve element; and the chamfered portion that reduces the diameter of the butterfly valve element from the maximum outer diameter portion to the downstream end face. The chamfer angle of the chamfered portion is 5° or less relative to the thickness direction of the butterfly valve element. The ridge line at which the chamfered portion and the downstream end face intersect each other falls within the imaginary circle that is centered on the central axis of the rod and passes the maximum outer diameter portion. This configuration can prevent the butterfly valve element from interfering with the inner peripheral surface of the flow passage when the rod is rotated to open and close the butterfly valve element, while keeping the gap as small as possible between the chamfered portion and the inner peripheral surface of the flow passage during valve closing. During valve closing, therefore, the inner peripheral surface of the flow passage, the maximum outer diameter portion, and the chamfered portion can function in combination as a restrictor in the flow passage to reduce a flow rate of gas allowed to pass through the flow passage. Since the gap between the chamfered portion and the inner peripheral surface of the flow passage during valve closing is maintained as small as possible, the restrictor function can be enhanced during valve closing or even when the rotation angle of the rod is small just after start of rotation, thereby preventing drastic release of gas from the vacuum chamber. Since such a drastic gas release from the vacuum chamber can be prevented, it is possible to prevent stirring-up of particles adhered on the wall surface of the vacuum chamber and positional displacement of a wafer fixed in the vacuum chamber and hence avoid an increase in percent of defective semiconductors.

To achieve the foregoing purpose, another aspect of the present disclosure provides a method for producing a non-sealed butterfly valve as described above, comprising the steps of: mounting the butterfly valve element from an upstream side of the flow passage onto the rod placed extending in the flow passage in the direction perpendicular to the flow passage; positioning the butterfly valve element in place to align a central axis of the butterfly valve element with a central axis of the flow passage; and fixing the butterfly valve element to the rod, wherein the step of positioning includes inserting a positioning jig into the flow passage from the upstream side of the flow passage, the outer peripheral surface of the butterfly valve element further includes a second chamfered portion extending over an entire circumference so that the butterfly valve element has a diameter decreasing to an end face that faces the upstream side of the flow passage during valve closing, the positioning jig has a cylindrical outer shape having an outer diameter approximately equal to an inner diameter of the flow passage and includes a contact surface at one end to be inserted in the flow passage, the contact surface being configured to contact with the second chamfered portion, and the contact surface of the positioning jig inserted in the flow passage contacts with the second chamfered portion in at least three points in a circumferential direction of the butterfly valve element to align the central axis of the butterfly valve element with the central axis of the flow passage.

In the foregoing production method of the non-sealed butterfly valve, the positioning step is performed to position the butterfly valve element in place by use of the positioning jig before the butterfly valve element is fixed to the rod. Accordingly, this method can easily enhance the accuracy of the mounting position of the butterfly valve element.

Since the outer diameter of the positioning jig is approximately equal to the inner diameter of the flow passage, simply inserting of this positioning jig into the flow passage enables to align the central axis of the jig with the central axis of the flow passage. While the central axis of the positioning jig is in alignment with the central axis of the flow passage, when the contact surface of the positioning jig contacts with the second chamfered portion in at least three points in the circumferential direction of the butterfly valve element, the central axis of the butterfly valve element is made coincident with the central axis of the flow passage. As variations, the contact surface of the positioning jig may contact with the second chamfered portion of the butterfly valve element in four or more points, not limited to three points, or contact with the entire surface of the second chamfered portion.

Advantageous Effects

The non-sealed butterfly valve of the present disclosure configured as above can prevent drastic gas release from the vacuum chamber. The production method of the non-sealed butterfly valve of the present disclosure configured as above can easily enhance the accuracy of the mounting position of the butterfly valve element.

DETAILED DESCRIPTION OF THE EXEMPLARY EMBODIMENTS

A detailed description of a non-sealed butterfly valve in an embodiment of this disclosure will now be given referring to the accompanying drawings.

Figure 1:
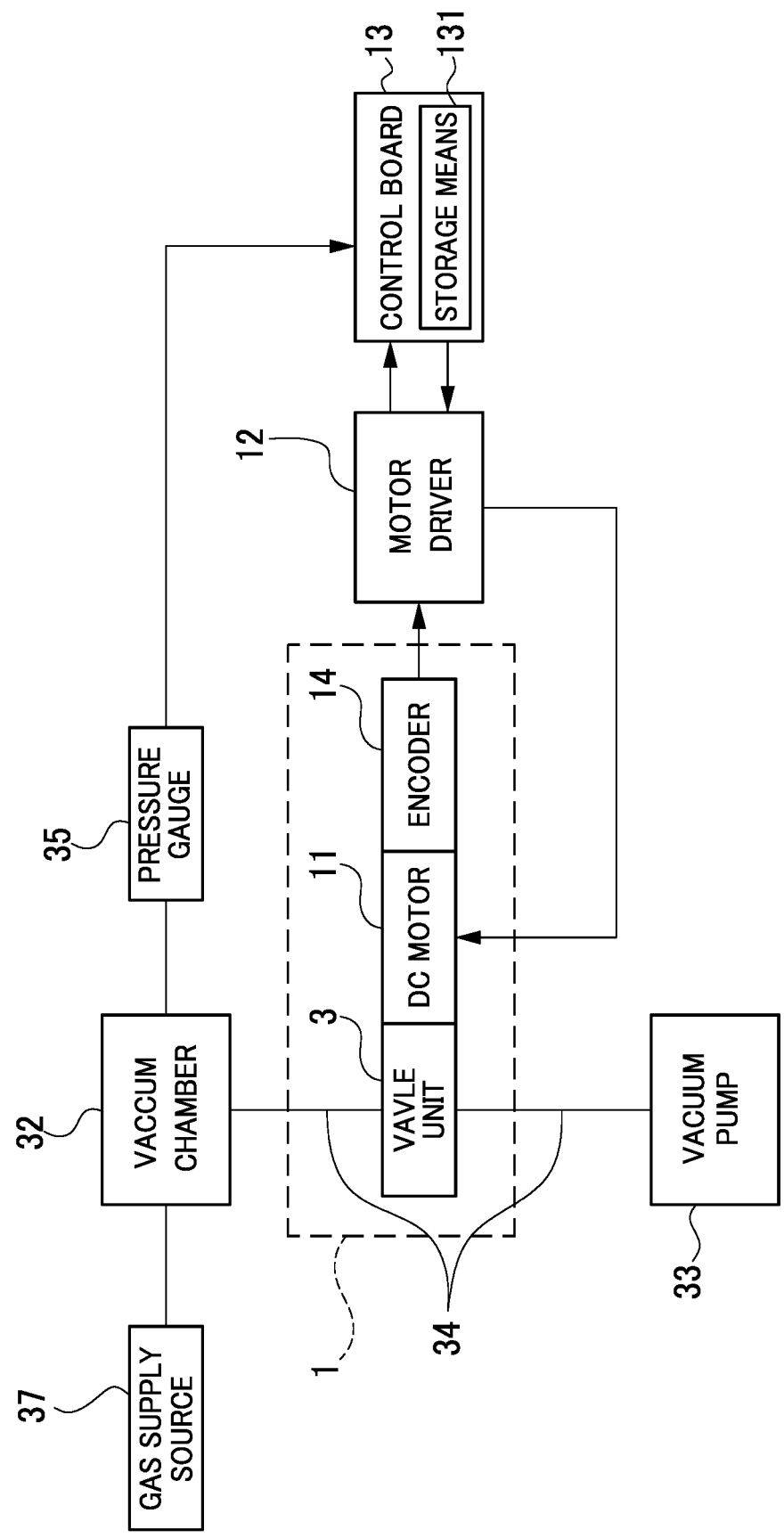
FIG. 1 is a schematic diagram of a vacuum pressure control system using a non-sealed butterfly valve in an embodiment of the present disclosure.

As shown in FIG. 1, in a semiconductor manufacturing process, a non-sealed butterfly valve 1 in the present embodiment is placed on a pipe 34 connecting a vacuum chamber 32 and a vacuum pump 33 and used as a vacuum pressure control device to control the pressure in the vacuum chamber 32 to which gas is supplied from a gas supply source 37.

Figure 2:
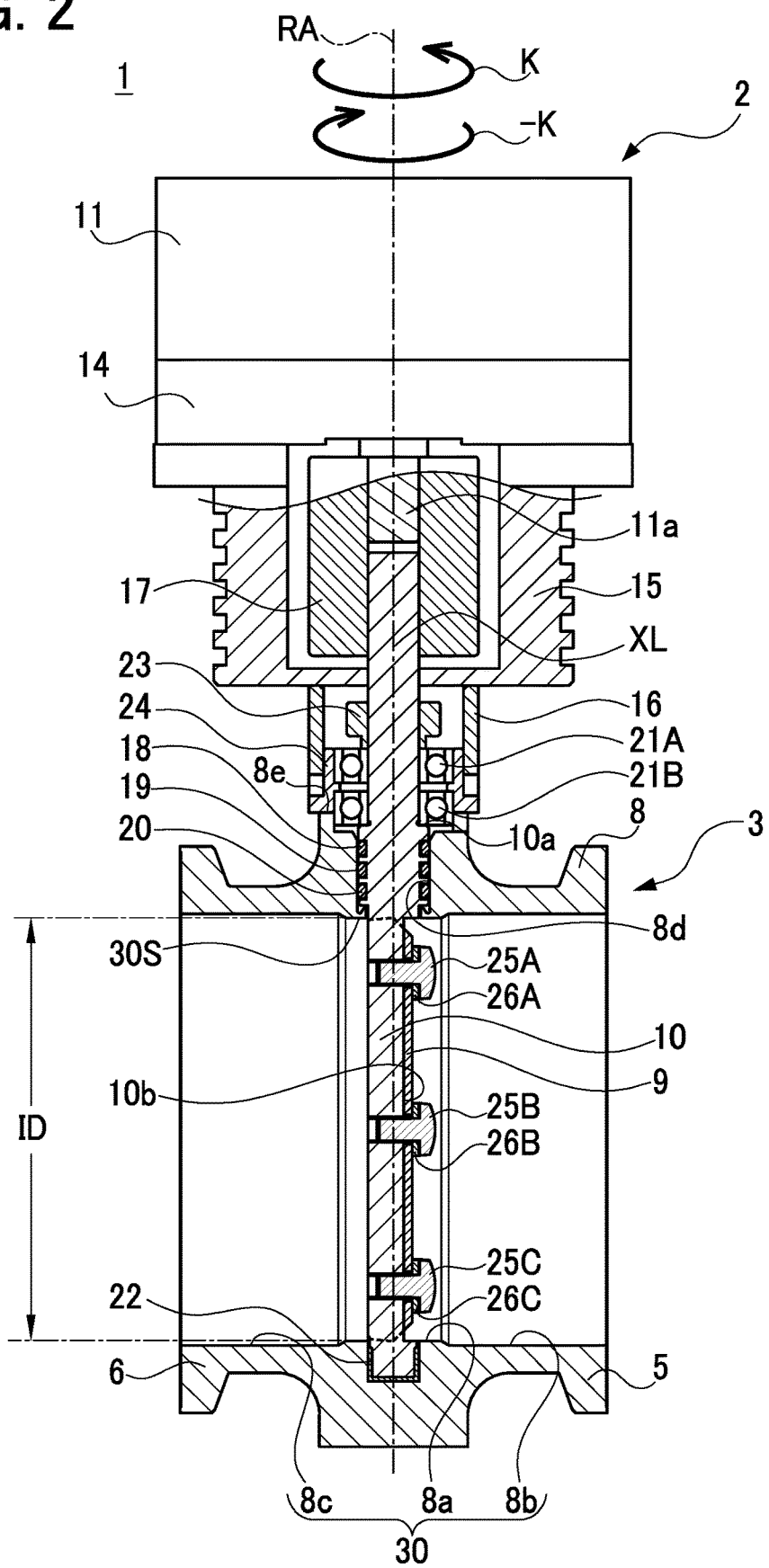
FIG. 2 is a cross-sectional view of the non-sealed butterfly valve taken in a direction parallel to the axis of a rotary shaft and parallel to a flow passage in the embodiment.
Figure 3:
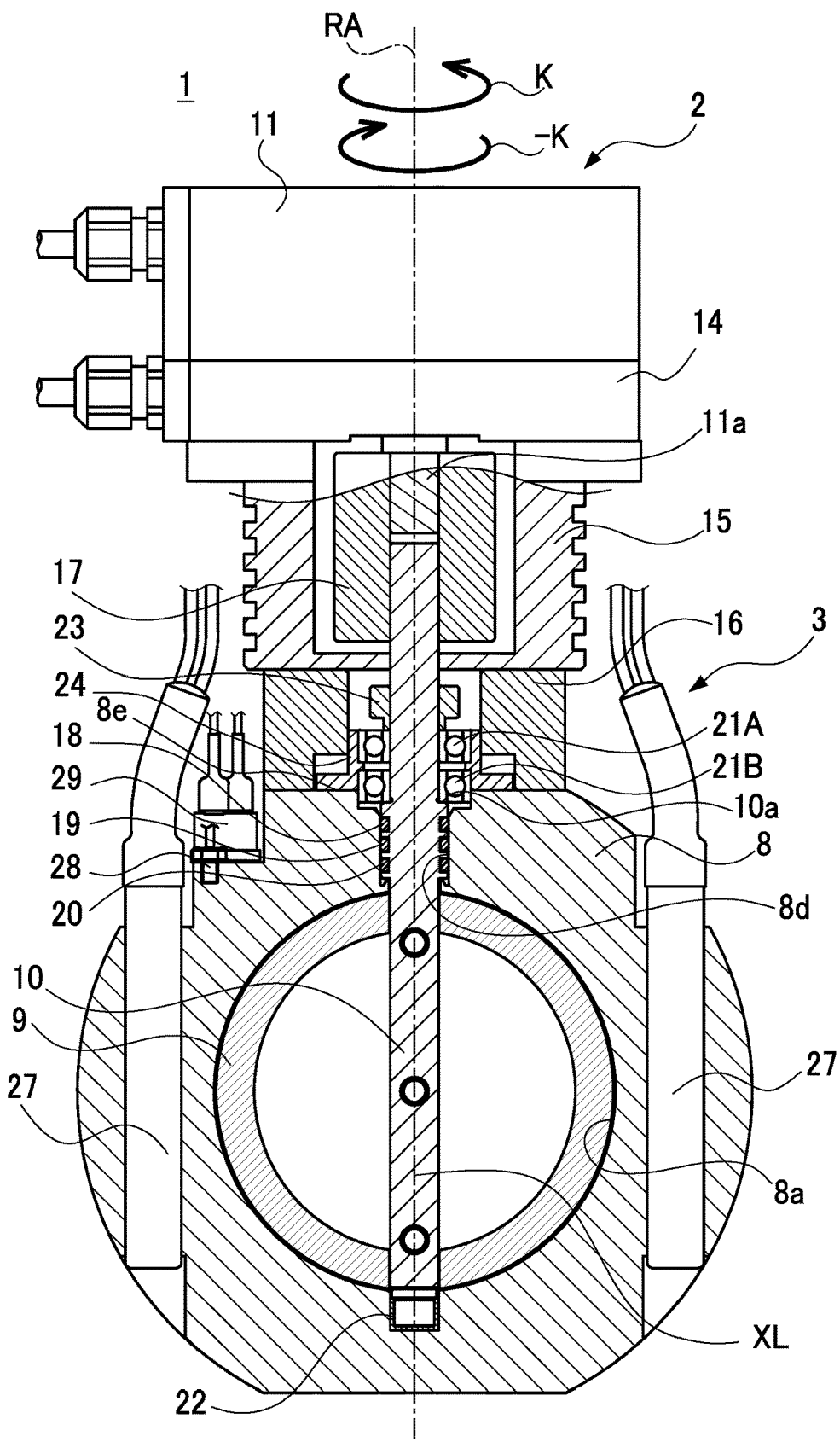
FIG. 3 is a cross-sectional view of the non-sealed butterfly valve taken in a direction parallel to the axis of the rotary shaft and perpendicular to the flow passage in the embodiment.

FIG. 2 is a cross-sectional view of the non-sealed butterfly valve 1 in the present embodiment, taken in a direction parallel to the axis RA of a rotary shaft 11a and parallel to a flow passage 30 as described later. FIG. 3 is a cross-sectional view of the same non-sealed butterfly valve 1 in the present embodiment, taken in a direction parallel to the axis RA of the rotatory shaft 11a and perpendicular to the flow passage 30. FIGS. 2 and 3 both show a valve-closed state.

The non-sealed butterfly valve 1 includes a drive unit 2 and a valve unit 3 as shown in FIGS. 2 and 3. The drive unit 2 includes a direct-drive motor (which will be hereinafter referred to as a "DD motor") 11. This DD motor 11 is connected to a motor driver 12 and an encoder 14 as shown in FIG. 1. Further, the motor driver 12 is connected to a control board 13. The DD motor 11 has no intermediate mechanism such as a reduction gear or the like. This results in size reduction of the drive unit 2, decrease in noise, and further enhancement of responsivity, speed stability, and positioning accuracy. Thus, the non-sealed butterfly valve 1 can perform vacuum pressure control with enhanced accuracy. The DD motor 11 includes the rotary shaft 11a whose rotation center is assumed as the axis RA as shown in FIGS. 2 and 3.

The control board 13 is connected to the motor driver 12 and a pressure gauge 35 for detecting the pressure in the vacuum chamber 32 as shown in FIG. 1. This control board 13 includes a storage means 131 that stores for example a closed position and an open position of a butterfly valve element 9 and a rotation angle of the rotary shaft 11a (i.e., a rotation angle of a rod 10 which will be described later) corresponding to an arbitrary target pressure and the like in the vacuum chamber 32. Based on the rotation angle read out from the storage means 131, the motor driver 12 controls the rotation of the DD motor 11.

The rotary shaft 11a is connected to one end (an upper end in FIGS. 2 and 3) of the rod 10 inserted in the valve unit 3 through a coupling 17 formed of a metal plate spring, as shown in FIGS. 2 and 3. Even if the rod 10 is heated by the process gas (e.g., a gas of about 200°) flowing through the flow passage 30, the heat is thus less likely to transfer to the DD motor 11 by the presence of the coupling 17.

The drive unit 2 is connected to the valve unit 3 through a heatsink 15 and a housing 16. This configuration can prevent the heat of the valve unit 3 heated by heaters 27 mentioned later from transferring to the drive unit 2.

The valve unit 3 connected to the drive unit 2 includes a valve body 8 and the butterfly valve element 9. The valve body 8 is made of stainless steel that is resistant to corrosion and heat.

The valve body 8 is provided with a joint 5 on the right end in FIG. 2 and a joint 6 on the left end in FIG. 2. The joint 5 has an inner peripheral surface defining an inlet passage 8b and the joint 6 has an inner peripheral surface defining an outlet passage 8c. A valve hole 8a is defined by an inner peripheral surface having a circular-arc cross-section in FIG. 3 between the inlet passage 8b and the outlet passage 8c. As shown in FIG. 2, the inlet passage 8b, the valve hole 8a, and the outlet passage 8c are provided coaxially and communicated with each other, forming a continuous flow passage 30. In a semiconductor manufacturing process, for example, as shown in FIG. 1, the joint 5 is connected to the vacuum chamber 32 through a pipe 34 and the joint 6 is connected to the vacuum pump 33 through another pipe 34 to release gas (e.g., process gas) from the vacuum chamber 32 through the flow passage 30.

The valve body 8 is provided with a thermocouple 28 serving as a temperature sensor to measure the temperature of the valve body 8 as shown in FIG. 3. The valve body 8 is further provided with a pair of heaters 27 placed on opposite sides of the valve hole 8a in its diametrical direction in order to keep the temperature of a process gas flowing through the flow passage 30. Those heaters 27 are cartridge heaters and connected to an external controller (not shown) provided outside the non-sealed butterfly valve 1. Specifically, those heaters 27 are controlled by the external controller to turn ON/OFF based on a measurement value of the thermocouple 28 to thereby adjust the temperature of the valve body 8. The valve body 8 further includes a thermostat 29. This thermostat 29 is activated if the heaters 27 go out of control, excessively heating the valve body 8. When the thermostat 29 starts to operate, the controller stops the heaters 27.

The valve body 8 includes an insertion through hole 8d that opens on an end face (an upper end face) 8e connected to the drive unit 2 and extends to the valve hole 8a, as shown in FIGS. 2 and 3. In this insertion through hole 8d, the rod 10 is inserted. The rod 10 inserted through the insertion through hole 8d extends across the valve hole 8a in a direction perpendicular to the flow passage 30.

The rod 10 is made of stainless steel which is non-magnetic and corrosion-resistant and formed in a columnar shape by machining. The portion of the rod 10 inserted in the flow passage 30 is provided with a valve-element mounting part 10b having a nearly D-shaped cross-section in a direction perpendicular to the axis RA (see FIGS. 4, 5, and 6).

Three O-rings 18, 19, and 20 are arranged between the rod 10 and the inner peripheral surface of the insertion through hole 8d in the axial direction of the rod 10. Those O-rings 18, 19, and 20 are compressed between the outer peripheral surface of the rod 10 and the inner peripheral surface of the insertion through hole 8d, thus preventing leakage of a fluid flowing through the flow passage 30 to the drive unit 2 via the insertion through hole 8d. Those three O-rings 18, 19, and 20 are the same kind of O-rings.

The other end (a lower end in FIGS. 2 and 3) of the rod 10 on a side inserted in the flow passage 30 is rotatably supported by a bush 22 as shown in FIGS. 2 and 3. The bush 22 is made of resin that is high in corrosion resistance and excellent in slidability. The rod 10 is rotatably supported by the ball bearings 21A and 21B arranged outside the valve body 8 and adjacently in the axial direction of the rod 10. This rod 10 is rotatably supported with its both ends by the ball bearings 21A and 21B and the bush 22. Since the rod 10 is in such a both-end supported state, its rotation axis is stabilized and less likely to wobble.

Each of the ball bearings 21A and 21B is precompressed by a collar 23, a bearing presser 24, and a flange 10a of the rod 10, so that any internal clearance is less likely to occur around the ball bearings 21A and 21B. This arrangement enhances the rigidity of the ball bearings 21A and 21B and hence can reduce vibration of the rod 10 during rotation and prevent deflection of the rotation axis of the rod 10.

The butterfly valve element 9 is secured to the rod 10 with screws 25A, 25B, and 25C and washers 26A, 26B, and 26C as shown in FIG. 2. Those three screws 25A, 25B, and 25C are all the same kind of screws and those three washers 26A, 26B, and 26C are all the same kind of washers.

Since the butterfly valve element 9 is connected to the rod 10, when the rotary shaft 11a of the DD motor 11 rotates in a normal direction K about the axis RA, the rod 10 coupled to the rotary shaft 11a through the coupling 17 is rotated about the central axis XL (coaxial with the axis RA of the rotary shaft 11a) in the normal direction K and accordingly the butterfly valve element 9 is also rotated in the same direction from a position that closes the valve hole 8a. When the rotation angle of the rod 10 reaches 90°, the butterfly valve element 9 comes to a valve-open position to open the flow passage 30, so that a high flow rate of gas is allowed to release from the vacuum chamber 32 through the butterfly valve 1.

Figure 4:
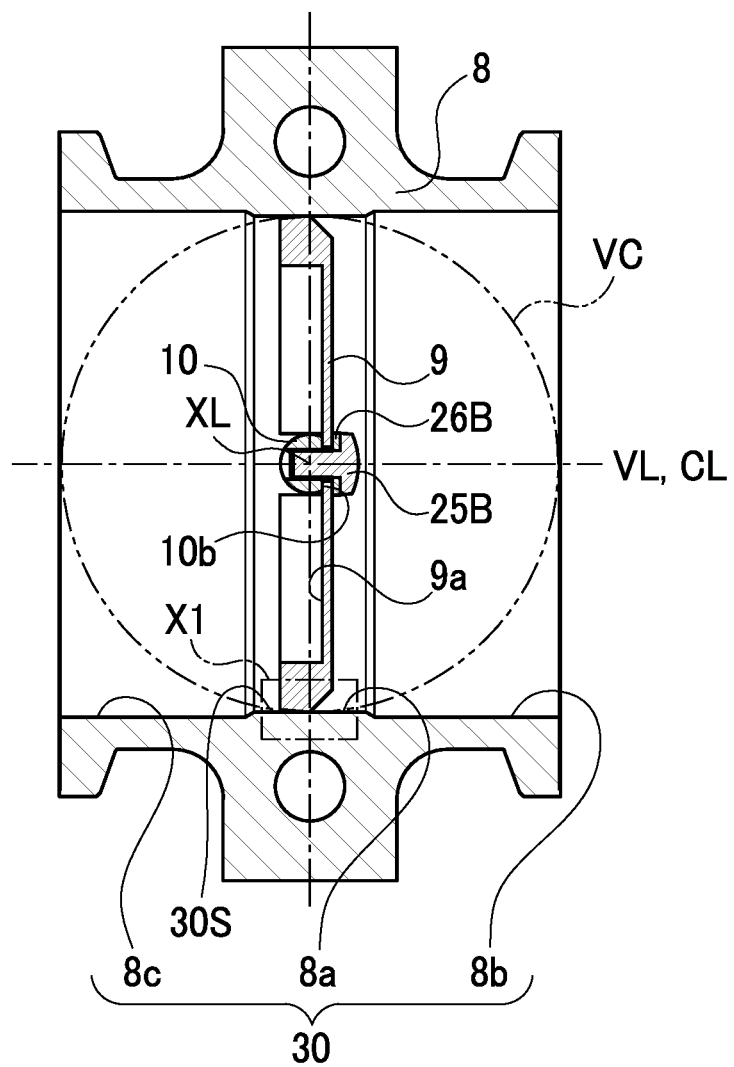
FIG. 4 is a cross-sectional view of the non-sealed butterfly valve taken in a direction perpendicular to the axis of the rotary shaft and parallel to the flow passage in the embodiment, showing a state of the butterfly valve element located in a closed position.

In contrast, while the butterfly valve element 9 is in the valve-open position, when the rotary shaft 11a of the DD motor 11 rotates 90° about the axis RA in a negative direction −K opposite the direction K for valve opening, the rod 10 is also rotated in the direction −K and, the butterfly valve element 9 comes to a closed position to close the valve hole 8a as shown in FIG. 4.

Figure 6:
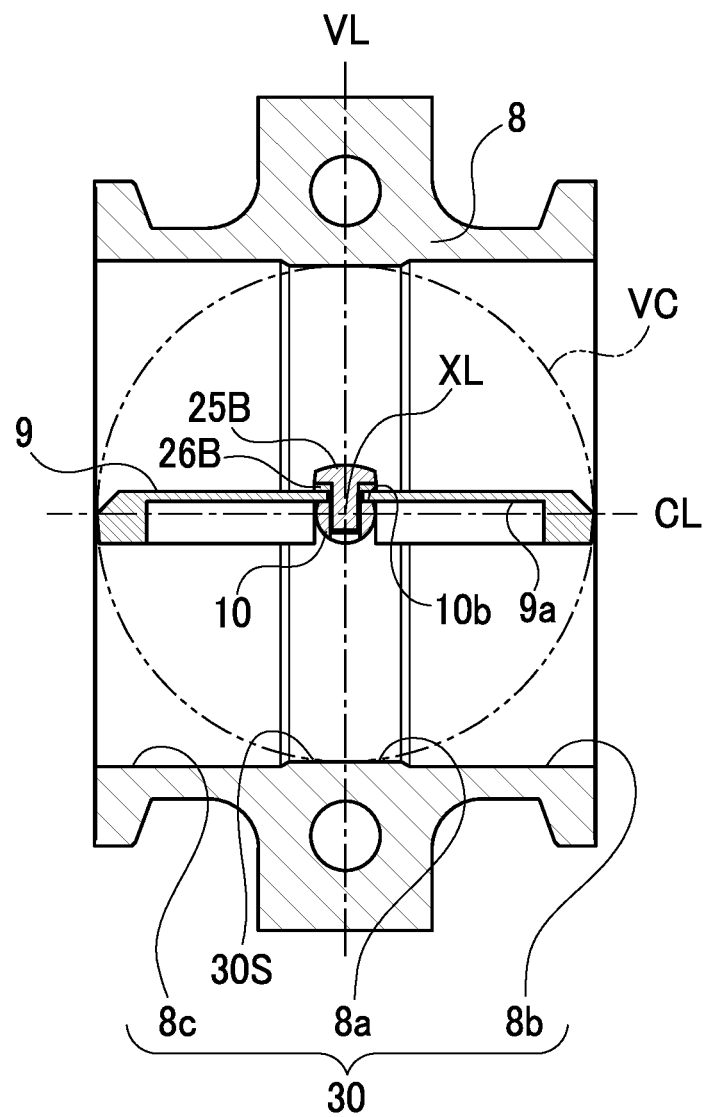
FIG. 6 is a cross-sectional view of the non-sealed butterfly valve taken in a direction perpendicular to the axis of the rotary shaft and parallel to the flow passage in the embodiment, showing a state of the butterfly valve element located in an open position.
Figure 7:
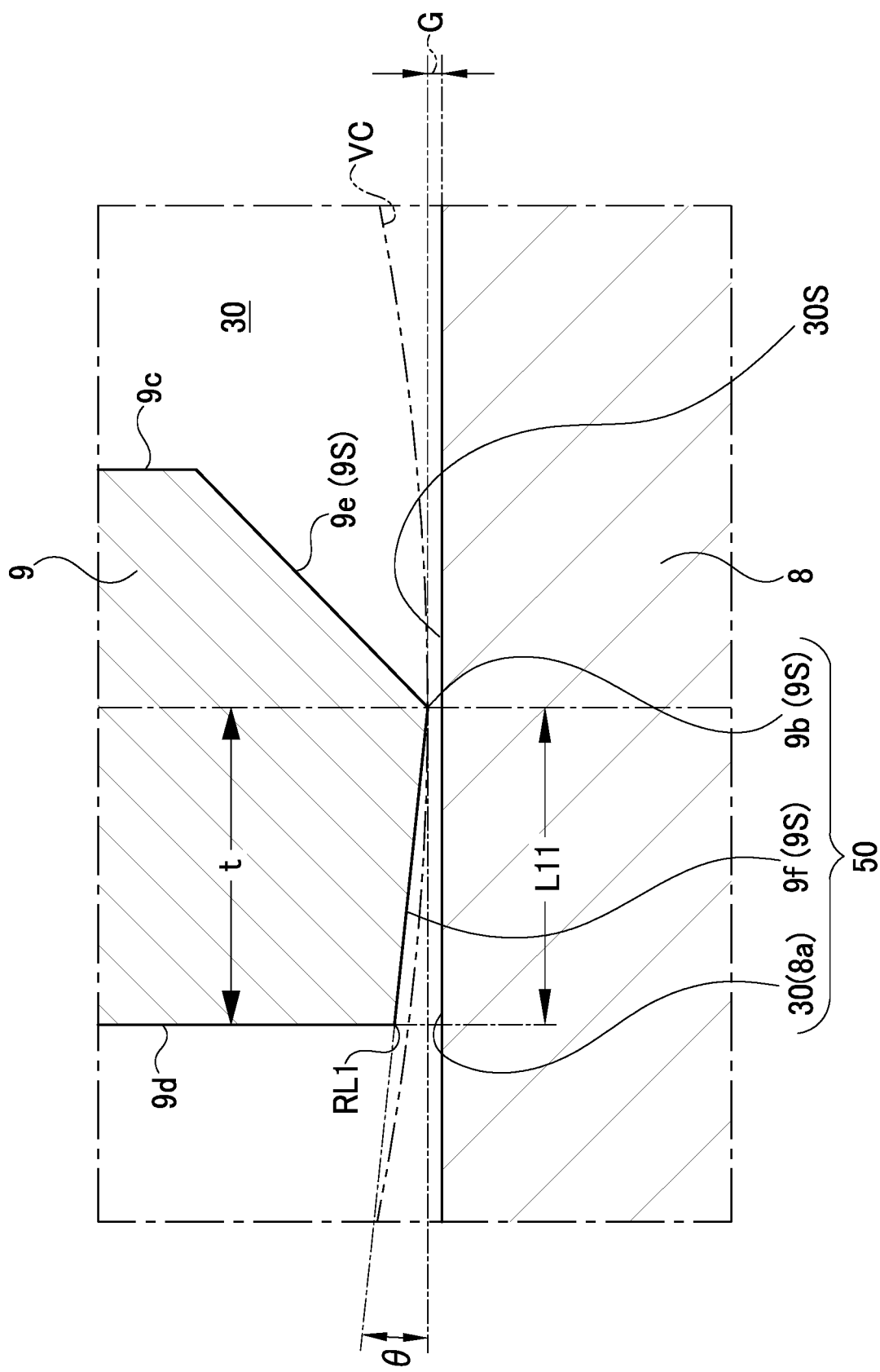
FIG. 7 is a partial enlarged view of a section X1 in FIG. 4.
Figure 8:
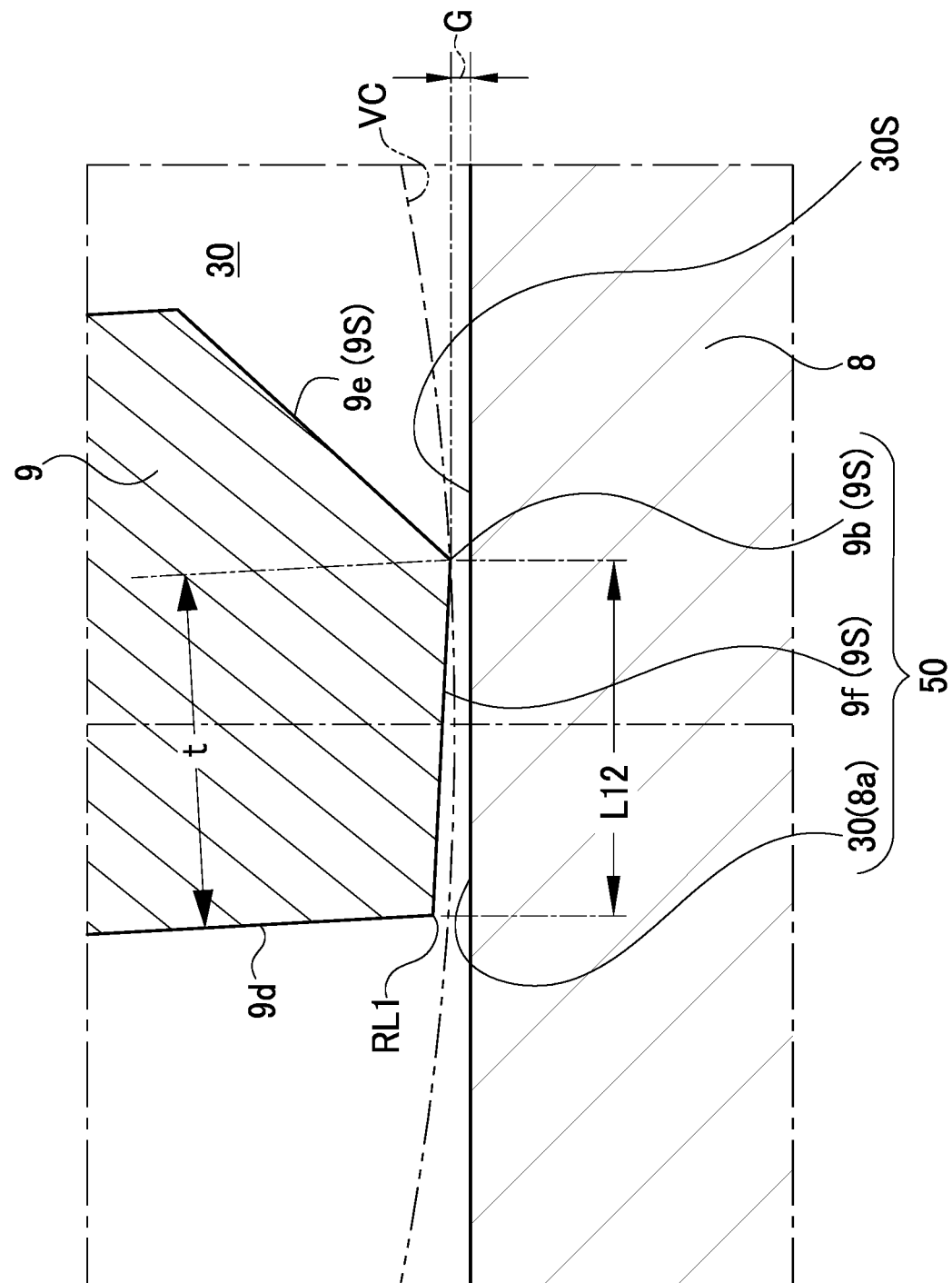
FIG. 8 is a partial enlarged view of a section X2 in FIG. 5.

The butterfly valve element 9 is made of stainless steel having corrosion resistance and heat resistance and formed in a circular disk shape by machining. The butterfly valve element 9 further includes a recessed portion 9a located in contact with valve-element mounting part 10b and has a nearly low U-shaped cross-section taken in a direction perpendicular to the axis RA (see FIGS. 4, 5, and 6). Furthermore, the butterfly valve element 9 includes, as shown in FIGS. 7 and 8, an outer peripheral surface 9S including a maximum outer diameter portion 9b having a maximum outer diameter, a first chamfered portion 9f that reduces the diameter of the butterfly valve element 9 from the maximum outer diameter portion 9b to a downstream end face 9d, and a second chamfered portion 9e that reduces the diameter of the butterfly valve element 9 from the maximum outer diameter portion 9b to an upstream end face 9c.

The maximum outer diameter portion 9b (the outer peripheral surface 9S) is configured to face the inner peripheral surface 30S of the flow passage 30 with a gap G of several tens of μm when the butterfly valve element 9 is in the valve-closed position. This maximum outer diameter portion 9b, the first chamfered portion 9f, and the inner peripheral surface 30S of the flow passage 30 (the valve hole 8a) form a restriction part 50 in the flow passage 30. In other words, the non-sealed butterfly valve 1 is configured such that the flow passage 30 is not perfectly sealed even when the butterfly valve element 9 is in the valve-closed position. Accordingly, gas release from the vacuum chamber 32 is not stopped, that is, the vacuum chamber 32 is continuously subjected to gas release by the suction force of the vacuum pump 33. This is because the ALD method only requires control of the pressure in a vacuum chamber without needing perfect sealing of the flow passage 30.

The first chamfered portion 9f has a chamfer angle θ equal to or less than 5° with respect to the thickness direction of the butterfly valve element 9 and further the ridge line RL1 at which the first chamfered portion 9f and the downstream end face 9d intersect each other falls within an imaginary circle VC that is centered on the central axis XL of the rod 10 (see FIGS. 4-6) and passes the maximum outer diameter portion 9b. This configuration can prevent the butterfly valve element 9 from interfering with the inner peripheral surface 30S of the flow passage 30 (the valve hole 8a) while the butterfly valve element 9 is opened or closed by rotation of the rod 10, and keep the gap G as small as possible between the first chamfered portion 9f (the outer peripheral surface 9S) and the inner peripheral surface 30S of the flow passage 30 (the valve hole 8a) during valve closing. The valve element 9 has the thickness t defined from the maximum outer diameter portion 9b to the downstream end face 9d so that the thickness t is equal to or more than 4% of the inner diameter ID of the flow passage 30. In the present embodiment, for example, the thickness t is 6 mm for the inner diameter ID of the flow passage 30 of 100 mm. In the present embodiment, the inner diameter ID of the flow passage 30 corresponds to the inner diameter of the valve hole 8a.

With the above configuration that (i) the gap G between the first chamfered portion 9f and the inner peripheral surface 30S of the flow passage 30 (the valve hole 8a) during valve closing is kept as small as possible and (ii) the thickness t defined from the maximum outer diameter portion 9b to the downstream end face 9d is set to 4% or more of the inner diameter ID of the flow passage 30, the length of the restriction part 50 (namely, a restriction length L11) in a direction parallel to the flow passage 30 can be obtained as long as possible. Since the restriction length L11 is provided as long as possible, a restriction length L12 can be ensured sufficiently long even when the rotation angle of the butterfly valve element 9 is small just after start of rotation from the valve-closed position as shown in FIG. 8.

The operations and effects of the non-sealed butterfly valve 1 configured as above will be described below.

The butterfly valve element 9 has the diameter that creates the gap G of several tens of μm with respect to the inner peripheral surface 30S of the flow passage 30 (the valve hole 8a) even when the butterfly valve element 9 is in the valve-closed position shown in FIG. 4. Accordingly, the non-sealed butterfly valve 1 continuously allows gas to be released from the vacuum chamber 32. FIG. 6 shows the butterfly valve element 9 in the valve-open position. To control the pressure in the vacuum chamber 32 to a target level, the butterfly valve element 9 is rotated by an arbitrary rotation angle between the valve-closed position (a rotation angle of 0°) and a valve-open position (a rotation angle of 90°) to adjust the flow passage area.

For instance, when a larger flow rate of gas is to be released from when the butterfly valve element 9 is held in the valve-closed position or in a rotated position with an arbitrary rotation angle to decrease the pressure in the vacuum chamber 32, the control board 13 of the non-sealed butterfly valve 1 reads out a rotation angle corresponding to a target pressure from the storage means 131. Based on this read rotation angle, the motor driver 12 drives the DD motor 11 by use of the encoder 14. The rod 10 is thus rotated by the DD motor 11 in the normal direction K to the read rotation angle. The butterfly valve element 9 coupled to the rod 10 is rotated together with the rod 10 in the normal direction K, thereby gradually widening the flow passage area of the flow passage 30 having been reduced.

In contrast, when a flow rate of gas to be released is to be reduced from when the butterfly valve element 9 is held in the valve-open position or in a rotated position at an arbitrary rotation angle to increase the pressure in the vacuum chamber 32, the control board 13 of the non-sealed butterfly valve 1 reads out a rotation angle corresponding to a target pressure from the storage means 131. Based on this read rotation angle, the motor driver 12 drives the DD motor 11 by use of the encoder 14. The rod 10 is thus rotated in the direction −K opposite the direction K for decreasing the pressure in the vacuum chamber 32. The butterfly valve element 9 coupled to the rod 10 is rotated together with the rod 10 in the direction −K, thereby reducing the flow passage area having been widened.

Herein, the speed of pressure decrease in the vacuum chamber 32 may be an issue during valve closing of the butterfly valve element 9 or when the rod 10 starts to rotate from the valve-closed position.

In the conventional non-sealed butterfly valve 101, the ridge line defined by the inner peripheral surface of the flow passage 130 and the maximum outer diameter portion 109a dominantly functions as the restriction part 150. Thus, the restriction part 150 has no length in a direction parallel to the flow passage 130, so that the effect of a restrictor with the length in the direction parallel to the flow passage 130 is not expected. The thus configured restriction part 150 produces only a small effect even during valve closing. Furthermore, the function of the restriction part 150 is suddenly lost even when the rotation angle of the rod 10 is small just after start of rotation and hence gas is drastically released from the vacuum chamber. Such a drastic gas release from the vacuum chamber causes an abrupt decrease in pressure value in the vacuum chamber. This may cause stirring-up of particles adhered on the wall surface of the vacuum chamber and positional displacement of a wafer fixed in the vacuum chamber.

Figure 5:
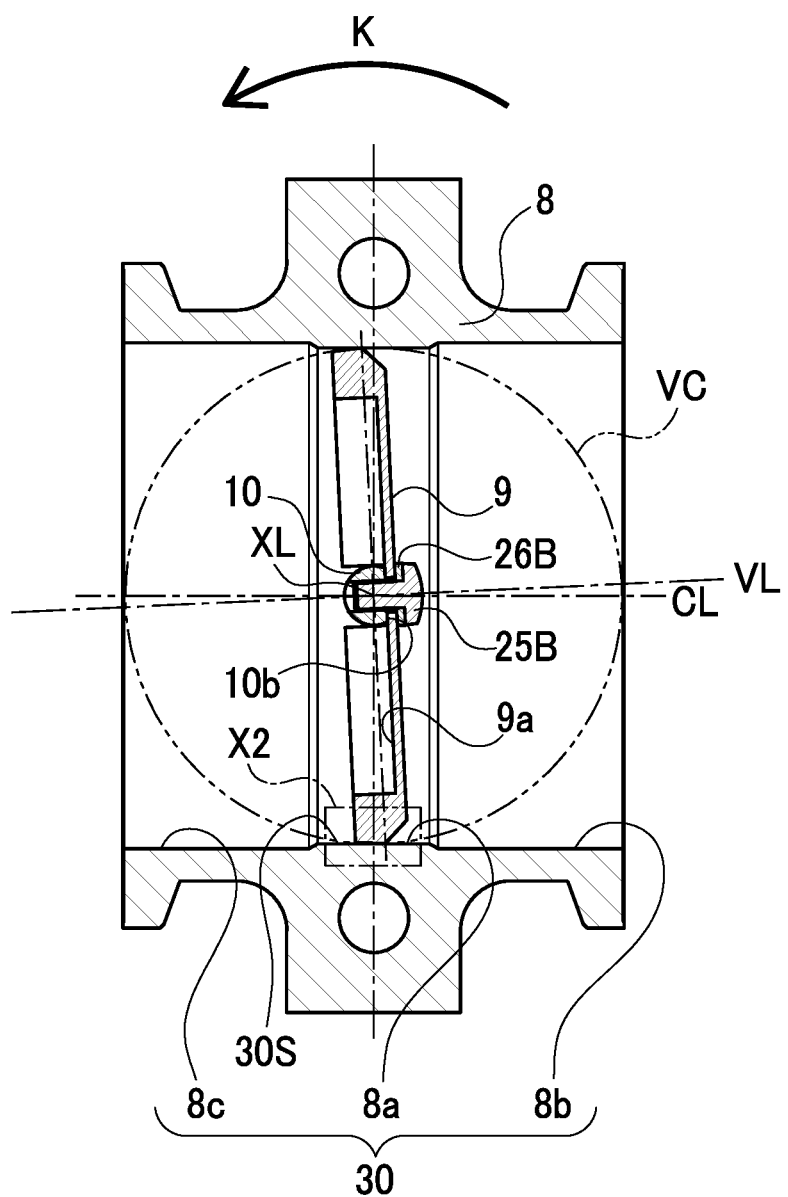
FIG. 5 is a cross-sectional view of the non-sealed butterfly valve taken in a direction perpendicular to the axis of the rotary shaft and parallel to the flow passage in the embodiment, showing a state of the butterfly valve element being at a small rotation angle just after starting to rotate.

In contrast, the non-sealed butterfly valve 1 in the present embodiment is configured such that the gap G between the first chamfered portion 9f of the butterfly valve element 9 and the inner peripheral surface 30S of the flow passage 30 (the valve hole 8a) is kept as small as possible and the thickness t of the butterfly valve element 9, defined from the maximum outer diameter portion 9b to the downstream end face 9d, is set to 4% or more of the inner diameter ID of the flow passage 30. Thus, the restriction length L11 is ensured as long as possible. Even during valve closing as shown in FIG. 4 or even when the rotation angle of the rod 10 is small just after start of rotation angle from the valve-closed position of the butterfly valve element 9 as shown in FIG. 5, the sufficient restriction length L12 is obtained as shown in FIG. 8, resulting in enhanced function of the restriction part 50. This configuration can therefore prevent drastic release of gas from the vacuum chamber 32. It is therefore possible to prevent stirring-up of particles adhered on the wall surface of the vacuum chamber 32 or positional displacement a wafer fixed in the vacuum chamber 32.

Figure 9:
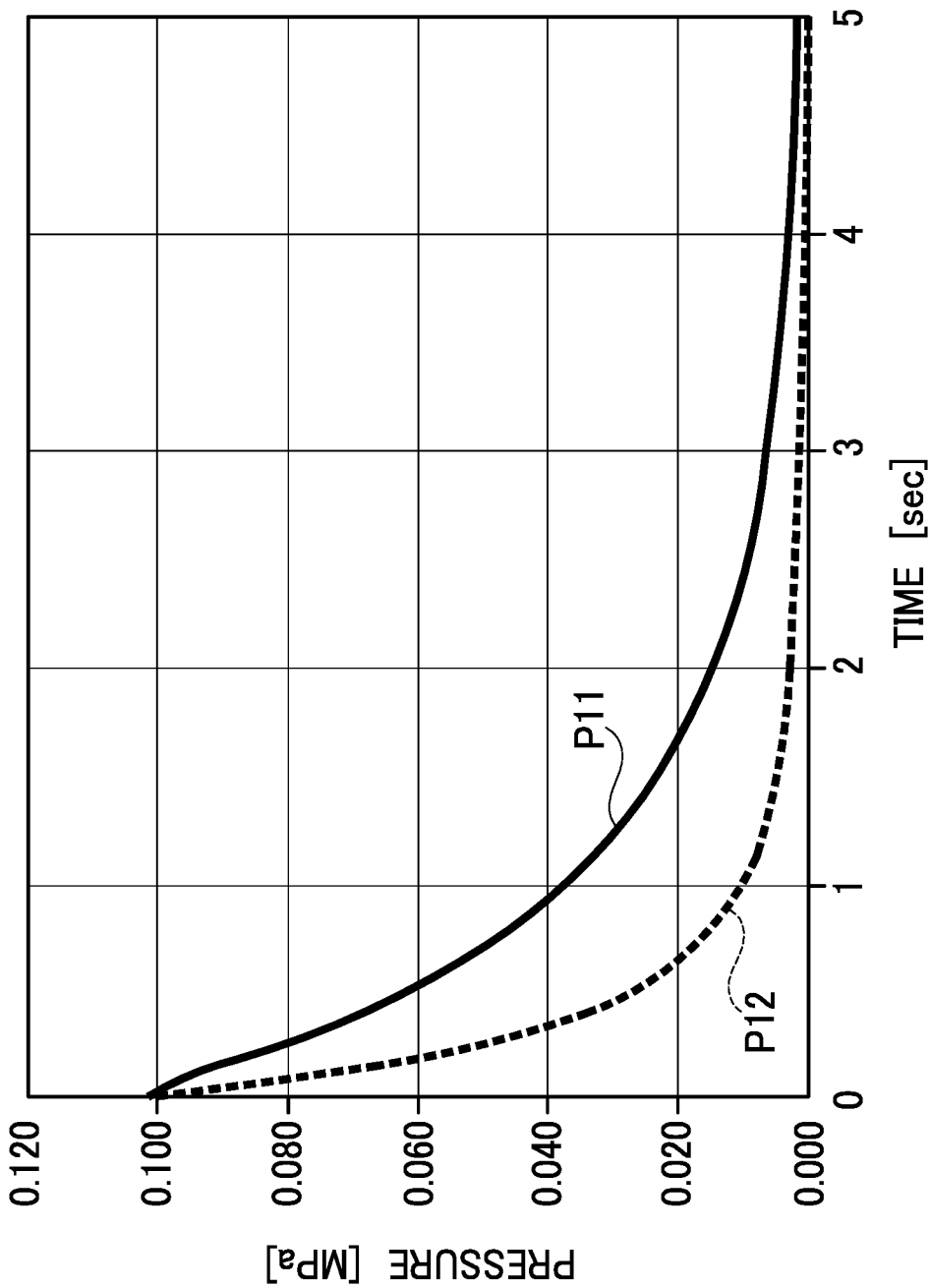
FIG. 9 is a graph showing variations in pressure value in a vacuum chamber using a conventional non-sealed butterfly valve and variations in pressure value in a vacuum chamber using the non-sealed butterfly valve in the embodiment.

FIG. 9 is a graph showing variations in pressure value (waveform P12) in the vacuum chamber 32 caused by activation of the vacuum pump 33 when the conventional non-sealed butterfly valve 101 is in the valve-closed state and variations in pressure value (waveform P11) in the vacuum chamber 32 caused by activation of the vacuum pump 33 when the non-sealed butterfly valve 1 in the present embodiment is in the valve-closed state. The vacuum pump 33 has started to operate at the time point of 0 seconds in the lateral axis of the graph.

As is found from the waveform P12, a drastic pressure drop occurs just after the time point of 0 seconds at which the vacuum pump 33 starts to operate. This indicates that the restriction part 150 formed by only the ridge line defined by the inner peripheral surface of the flow passage 130 and the maximum outer diameter portion 109a only produces a small effect.

In contrast, it is found that the waveform P11 more slowly lowers in pressure value than the waveform P12. This is because the restriction length L11 is ensured as long as possible, so that the restriction part 50 produces a larger effect than in the conventional non-sealed butterfly valve 101 and can prevent drastic gas release from the vacuum chamber 32.

Next, a method for producing the non-sealed butterfly valve 1 in the present embodiment will be described below.

The non-sealed butterfly valve 1 is configured such that the gap G between the maximum outer diameter portion 9b of the butterfly valve element 9 and the inner peripheral surface 30S of the flow passage 30 (the valve hole 8a) is as very small as several tens of Thus, the mounting position of the butterfly valve element 9 needs extremely high accuracy to prevent interference of the butterfly valve element 9 with the inner peripheral surface 30S of the flow passage 30 (the valve hole 8a). Therefore, the butterfly valve element 9 is mounted on the rod 10 in the following manner in order to enhance the accuracy of the mounting position of the butterfly valve element 9.

Figure 10:
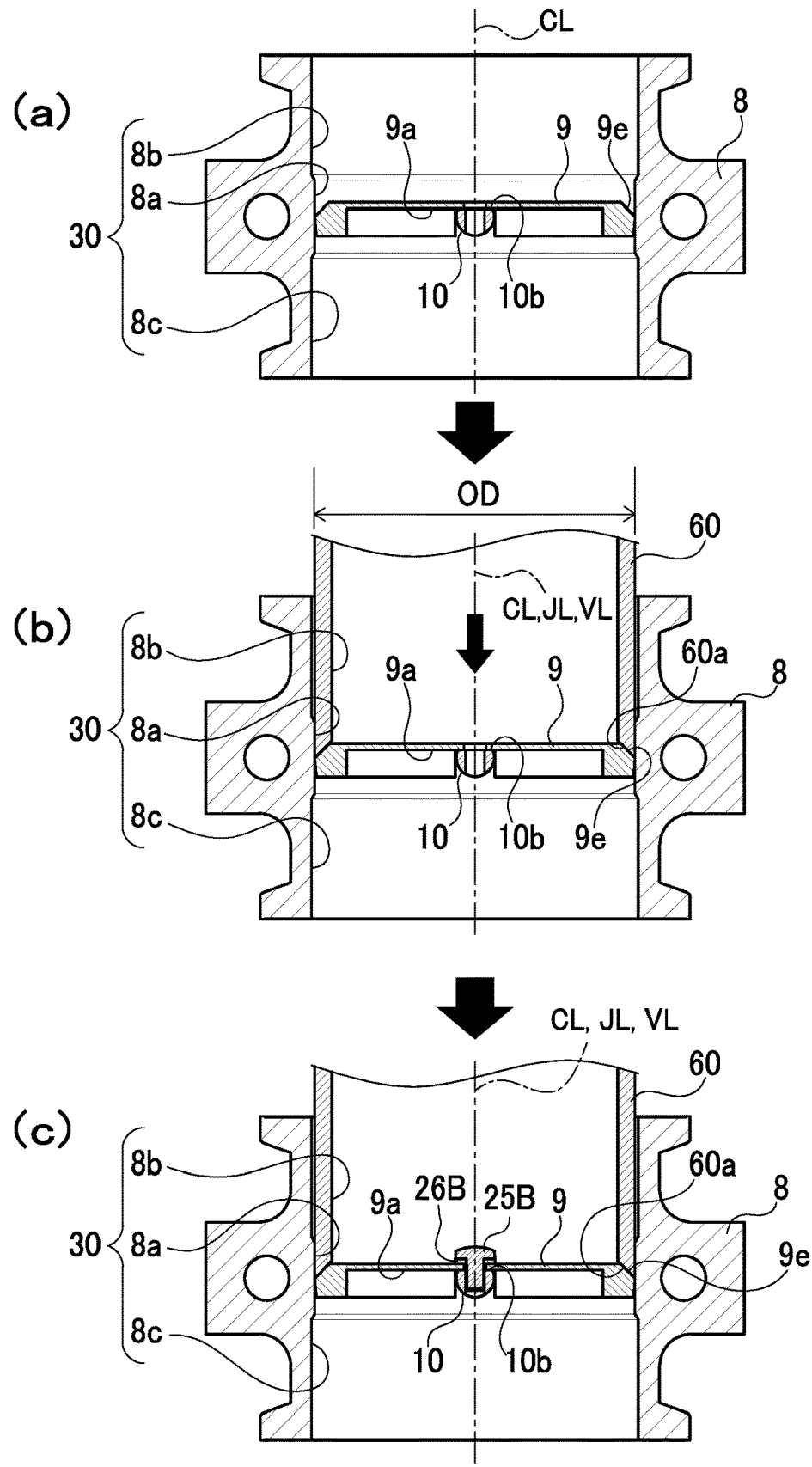
FIG. 10 is an explanatory diagram showing steps of mounting the butterfly valve element onto the rod.
Figure 11:
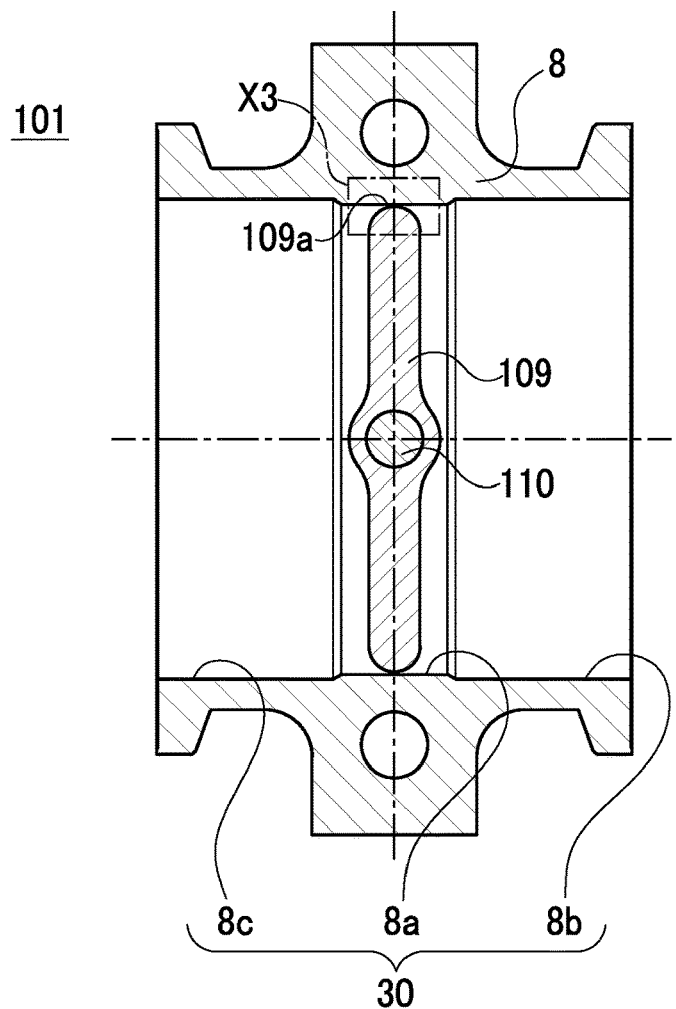
FIG. 11 is a cross-sectional view of a conventional non-sealed butterfly valve taken in a direction perpendicular to the axis of a rotary shaft and parallel to a flow passage, showing a state of a butterfly valve element located in a closed position.
Figure 12:
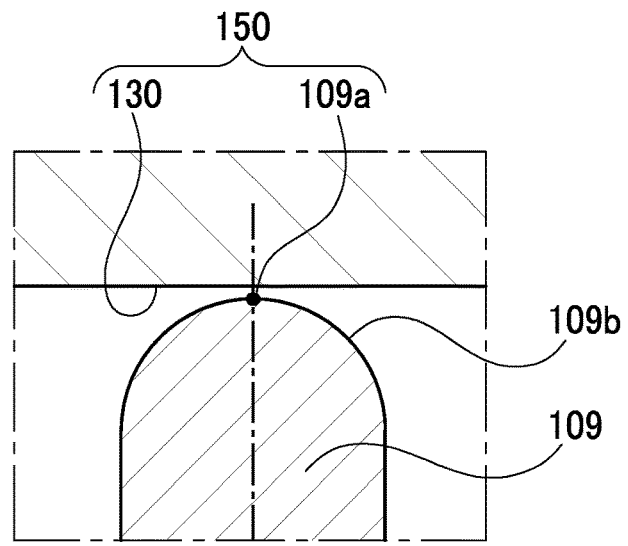
FIG. 12 is a partial enlarged view of a section X3 in FIG. 11.

As shown in FIG. 10(a), the butterfly valve element 9 is first put on the rod 10 placed extending in a direction perpendicular to the flow passage 30. Specifically, the butterfly valve element 9 is inserted into the flow passage 30 from the inlet flow passage 8b corresponding to an upstream side of the flow passage 30 and placed onto the rod 10 so that the recessed portion 9a of the butterfly valve element 9 contacts with the valve-element mounting part 10b of the rod 10. At this stage, the butterfly valve element 9 is not secured to the rod 10.

As shown in FIG. 10(b), successively, the positioning jig 60 is inserted in the flow passage 30 to position the butterfly valve element 9 in place so that its central axis VL aligns with the central axis CL of the flow passage 30. The positioning jig 60 has a cylindrical shape with the outer diameter OD approximately equal to the inner diameter of the valve hole 8a (i.e., the inner diameter ID of the flow passage 30). Further, the positioning jig 60 has a contact surface 60a configured to extend over the entire circumference at one end to be inserted in the flow passage 30 and come into contact with the second chamfered portion 9e of the butterfly valve element 9. The contact surface 60a is designed with the same angle as the chamfer angle of the second chamfered portion 9e to make abutting contact therewith.

When the positioning jig 60 having the outer diameter OD approximately equal to the inner diameter (ID) of the valve hole 8a is inserted in the flow passage 30 through the inlet flow passage 8b, the central axis JL of the positioning jig 60 coincides with the central axis CL of the flow passage 30. Since the central axis JL of the positioning jig 60 is in alignment with the central axis CL of the flow passage 30, when the contact surface 60a of the positioning jig 60 contacts with the second chamfered portion 9e of the butterfly valve element 9, the central axis VL of the butterfly valve element 9 is made coincident with the central axis CL of the flow passage 30. The contact surface 60a is provided over the entire circumference of the positioning jig 60 and thus can abut against the entire surface of the second chamfered portion 9a; however, the entire surface of the contact surface 60a is not necessarily required to contact with the second chamfered portion 9e. For example, the positioning jig 60 may be provided with three separate contact surfaces 60a arranged at equal intervals in the circumferential direction of the positioning jig 60 to contact with the second chamfered portion 9e at those three positions. This configuration can also serve to position the butterfly valve element 9 in place.

As shown in FIG. 10(c), thereafter, the butterfly valve element 9 is fixed to the rod 10 with the screws 25A, 25B, and 25C and the washers 26A, 26B, and 26C (only the screw 25B and the washer 26B are illustrated in FIG. 10(c)) while the central axis of the butterfly valve element 9 coincides with the central axis CL of the flow passage 30. In other words, as shown in FIG. 2, the butterfly valve element 9 is connected to the rod 10 at three positions using the screws 25A to 25C and the washers 26A to 26C.

As described above, the method includes, before fixing the butterfly valve element 9 to the rod 10, the positioning step of aligning the central axis VL of the butterfly valve element 9 with the central axis CL of the flow passage 30. This method can therefore enhance the accuracy of the mounting position of the butterfly valve element 9.

As described above, the non-sealed butterfly valve 1 and the method for producing the same in the present embodiment are configured as below.

(1) The non-sealed butterfly valve 1 to be placed on the pipe 34 connecting the vacuum chamber 32 and the vacuum pump 33 to control the vacuum pressure in the vacuum chamber 32 includes the flow passage 30, the rod 10 placed extending in a direction perpendicular to the flow passage 30, and the circular disk-shaped butterfly valve element 9 coupled to the rod 10 and configured to rotate in association with the rotation of the rod 10 about its central axis XL to open and close the flow passage 30, the inner peripheral surface 30S of the flow passage 30 and the outer peripheral surface 9S of the butterfly valve element 9 being configured to provide the predetermined gap G therebetween during valve closing. The butterfly valve element 9 includes the downstream end face 9d that faces the downstream side of the flow passage 30 during valve closing and the maximum outer diameter portion 9b that makes the gap G minimum with a minimum distance. The butterfly valve element 9 includes the first chamfered portion 9f extending over the entire outer circumference so that the butterfly valve element 9 has a diameter decreasing from the maximum outer diameter portion 9b to the downstream end face 9d. The first chamfered portion 9f has a chamfer angle θ equal to or less than 5° relative to the thickness direction of the butterfly valve element 9. The first chamfered portion 9f and the downstream end face 9d intersect each other at the ridge line RL1 falling within the imaginary circle VC centered on the central axis XL of the rod 10, the imaginary circle VC passing the maximum outer diameter portion 9b. Accordingly, the thus configured non-sealed butterfly valve 1 can prevent drastic release of gas from the vacuum chamber 32.

The butterfly valve element 9 includes: the maximum outer diameter portion 9b that makes the predetermined gap G with a minimum distance between the inner peripheral surface 30S of the flow passage 30 and the outer peripheral surface 9S of the butterfly valve element 9; and the first chamfered portion 9f that reduces the diameter of the butterfly valve element 9 from the maximum outer diameter portion 9b to the downstream end face 9d. The chamfer angle θ of the first chamfered portion 9f is equal to or less than 5° relative to the thickness direction of the butterfly valve element 9. The ridge line RL1 at which the first chamfered portion 9f and the downstream end face 9d intersect each other falls within the imaginary circle VC that is centered on the central axis XL of the rod 10 and passes the maximum outer diameter portion 9b. This configuration can prevent the butterfly valve element 9 from interfering with the inner peripheral surface of the flow passage 30 when the rod 10 is rotated to open and close the butterfly valve element 9, while keeping the gap G as small as possible between the first chamfered portion 9f and the inner peripheral surface of the flow passage 30 during valve closing. During valve closing, therefore, the inner peripheral surface 30S of the flow passage 30, the maximum outer diameter portion 9b, and the first chamfered portion 9f can function as the restriction part 50 in the flow passage 30. Since the gap G between the first chamfered portion 9f and the inner peripheral surface 30S of the flow passage 30 during valve closing is maintained as small as possible, the function of the restriction part 50 can be enhanced during valve closing or even when the rotation angle of the rod 10 is small just after start of rotation from the valve-closed position, thereby preventing drastic release of gas from the vacuum chamber 32. Since such a drastic gas release from the vacuum chamber 32 can be prevented, it is possible to prevent stirring-up of particles adhered on the wall surface of the vacuum chamber 32 and positional displacement of a wafer fixed in the vacuum chamber 32 and hence avoid an increase in percent defective of semiconductors.

(2) In the non-sealed butterfly valve 1 described in (1), the butterfly valve element 9 has the thickness t defined from the maximum outer diameter portion 9b to the downstream end face 9d so that the thickness t is equal to or more than 4% of the inner diameter ID of the flow passage 30. Accordingly, the first chamfered portion 9f can have a sufficient length in the direction of thickness of the butterfly valve element 9. Further, the restriction part 50 formed by the inner peripheral surface 30S of the flow passage 30, the maximum outer diameter portion 9b, and the first chamfered portion 9f during valve closing can have a sufficiently length in the direction parallel to the flow passage 30 (i.e., the restriction length L11).

(3) The method for producing the non-sealed butterfly valve 1 described in (1) or (2) includes the positioning step of aligning the central axis VL of the butterfly valve element 9 with the central axis CL of the flow passage 30, the positioning step being performed after mounting the butterfly valve element 9 from the upstream side of the flow passage 30 onto the rod 10 placed in the direction perpendicular to the flow passage 30, but before fixing the butterfly valve element 9 to the rod 10.

This positioning step is performed by inserting the positioning jig 60 into the flow passage 30 from the upstream side of the flow passage 30. The outer peripheral surface 9S of the butterfly valve element 9 further includes the second chamfered portion 9e extending over the entire circumference so that the butterfly valve element 9 has the diameter decreasing to the end face (the upstream-side end face 9c) that faces the upstream side of the flow passage 30 during valve closing. The positioning jig 60 has a cylindrical outer shape having the outer diameter OD approximately equal to the inner diameter ID of the flow passage 30 and includes the contact surface 60a at the end to be inserted in the flow passage 30, the contact surface 60a being configured to contact with the second chamfered portion 9e. When the positioning jig 60 is inserted into the flow passage 30, the contact surface 60a comes into contact with the second chamfered portion 9e in at least three points in the circumferential direction of the butterfly valve element 9, thereby aligning the central axis VL of the butterfly valve element 9 with the central axis CL of the flow passage 30. Since the method includes the positioning step of positioning the butterfly valve element 9 in place by use of the positioning jig 60 before fixing the butterfly valve element 9 to the rod 10, the accuracy of the mounting position of the butterfly valve element 9 can be easily enhanced.

Since the positioning jig 60 has the outer diameter OD approximately equal to the inner diameter ID of the flow passage 30 as described above, simply inserting of this positioning jig 60 into the flow passage 30 enables to align the central axis JL of this jig 60 with the central axis CL of the flow passage 30. While the central axis JL of the positioning jig 60 is in alignment with the central axis CL of the flow passage 30, when the contact surface 60a of the positioning jig 60 contacts with the second chamfered portion 9e in at least three points in the circumferential direction of the butterfly valve element 9, the central axis VL of the butterfly valve element 9 is made to coincide with the central axis CL of the flow passage 30. The contact surface 60a may contact with not only three points but also four or more points or contact with the entire surface of the second chamfered portion 9e.

The foregoing embodiments are mere examples and give no limitation to the present disclosure. The present disclosure may be embodied in other specific forms without departing from the essential characteristics thereof. For instance, the positioning jig 60 in the foregoing embodiment is designed with the outer diameter OD almost equal to the inner diameter of the valve hole 8a; however, as an alternative, the positioning jig 60 may have the outer diameter OD almost equal to the inner diameter of the inlet flow passage 8b.

REFERENCE SIGNS LIST

1 Non-sealed butterfly valve
Butterfly valve element
9d Maximum outer diameter portion
9d Downstream end face
9f First chamfered portion (One example of chamfered portion)
10 Rod
30 Flow passage
32 Vacuum chamber
33 Vacuum pump
34 Pipe VC Virtual circle
RL1 Ridge line

What is claimed is:

1. A non-sealed butterfly valve to be placed on a pipe connecting a vacuum chamber and a vacuum pump to control vacuum pressure in the vacuum chamber, the non-sealed butterfly valve comprising:
    a flow passage;
    a rod placed extending in a direction perpendicular to the flow passage; and
    a butterfly valve element having a circular disk shape, coupled to the rod and configured to rotate in association with rotation of the rod about a central axis of the rod to open and close the flow passage,
    the butterfly valve element including an outer peripheral surface configured to make a predetermined gap with respect to an inner peripheral surface of the flow passage during valve closing,
    wherein the butterfly valve element includes a downstream end face that faces a downstream side of the flow passage during valve closing and the outer peripheral surface having a maximum outer diameter portion that makes the gap with a minimum distance,
    the outer peripheral surface of the butterfly valve element further includes a chamfered portion extending over an entire outer circumference so that the butterfly valve element has a diameter decreasing from the maximum outer diameter portion to the downstream end face,
    the chamfered portion has an angle equal to or less than 5° relative to a thickness direction of the butterfly valve element, and
    the chamfered portion and the downstream end face intersect each other at a ridge line falling within an imaginary circle centered on the central axis of the rod, the imaginary circle passing the maximum outer diameter portion.

2. The non-sealed butterfly valve according to claim 1, wherein the butterfly valve element has thickness defined from the maximum outer diameter portion to the downstream end face so that the thickness is equal to or more than 4% of an inner diameter of the flow passage.

3. A method for producing a non-sealed butterfly valve according to claim 1, comprising the steps of:
    mounting the butterfly valve element from an upstream side of the flow passage onto the rod placed extending in the flow passage in the direction perpendicular to the flow passage;
    positioning the butterfly valve element in place to align a central axis of the butterfly valve element with a central axis of the flow passage; and
    fixing the butterfly valve element to the rod,
    wherein the step of positioning includes inserting a positioning jig into the flow passage from the upstream side of the flow passage,
    the outer peripheral surface of the butterfly valve element further includes a second chamfered portion extending over an entire circumference so that the butterfly valve element has a diameter decreasing to an end face that faces the upstream side of the flow passage during valve closing,
    the positioning jig has a cylindrical outer shape having an outer diameter approximately equal to an inner diameter of the flow passage and includes a contact surface at one end to be inserted in the flow passage, the contact surface being configured to contact with the second chamfered portion, and the contact surface of the positioning jig inserted in the flow passage contacts with the second chamfered portion in at least three points in a circumferential direction of the butterfly valve element to align the central axis of the butterfly valve element with the central axis of the flow passage.

4. A method for producing a non-sealed butterfly valve according to claim 2, comprising the steps of:

mounting the butterfly valve element from an upstream side of the flow passage onto the rod placed extending in the flow passage in the direction perpendicular to the flow passage;

positioning the butterfly valve element in place to align a central axis of the butterfly valve element with a central axis of the flow passage; and fixing the butterfly valve element to the rod, wherein the step of positioning includes inserting a positioning jig into the flow passage from the upstream side of the flow passage, the outer peripheral surface of the butterfly valve element further includes a second chamfered portion extending over an entire circumference so that the butterfly valve element has a diameter decreasing to an end face that faces the upstream side of the flow passage during valve closing, the positioning jig has a cylindrical outer shape having an outer diameter approximately equal to an inner diameter of the flow passage and includes a contact surface at one end to be inserted in the flow passage, the contact surface being configured to contact with the second chamfered portion, and the contact surface of the positioning jig inserted in the flow passage contacts with the second chamfered portion in at least three points in a circumferential direction of the butterfly valve element to align the central axis of the butterfly valve element with the central axis of the flow passage.

\* \* \* \* \*